(12) United States Patent
Winarski et al.

(10) Patent No.: US 6,250,550 B1
(45) Date of Patent: Jun. 26, 2001

(54) AUTOMATED MEDIA STORAGE LIBRARY WITH VARIABLE FOCAL LENGTH LENS

(75) Inventors: Daniel James Winarski, Tucson, AZ (US); Masaki Hasegawa, Kanagawa-ken (JP); Kamal Emile Dimitri; Robert LaMar Bingham, both of Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/333,079

(22) Filed: Jun. 14, 1999

(51) Int. Cl.[7] ................................................ G06K 15/00
(52) U.S. Cl. ........................ 235/383; 349/201; 700/214
(58) Field of Search .............................. 235/383, 462.32; 349/33, 31, 73, 77, 200, 201; 700/213, 214, 215; 369/33, 34

(56) References Cited

U.S. PATENT DOCUMENTS

| | | | |
|---|---|---|---|
| 3,424,513 | * | 1/1969 | Lotspeich ............................ 359/483 |
| 4,393,712 | * | 7/1983 | Sandhu ................................ 73/603 |
| 5,071,229 | * | 12/1991 | Oaki et al. .......................... 359/53 |
| 5,151,814 | * | 9/1992 | Brinberg et al. .................... 359/209 |
| 5,596,430 | * | 1/1997 | Hasegawa et al. ................. 349/74 |
| 5,877,876 | * | 3/1999 | Birdwell ............................. 359/39 |
| 5,898,593 | * | 4/1999 | Baca et al. .......................... 364/478.02 |
| 6,024,283 | * | 2/2000 | Campanelli et al. ............... 235/462.32 |
| 6,038,490 | * | 3/2000 | Dimitri et al. ..................... 700/214 |

FOREIGN PATENT DOCUMENTS 12-081570 * 3/2000 (JP) .

* cited by examiner

Primary Examiner—Karl D. Frech
Assistant Examiner—Diane I. Lee
(74) Attorney, Agent, or Firm—Douglas R. Millett; Bracewell & Patterson, L.L.P.

(57) ABSTRACT

A bar code reader for an automated storage library has a lens assembly with a pair of polarized liquid crystal lenses. Each lens has pair of parallel glass plates that are separated by upper and lower glass substrates. A series of polymer films are symmetrically spaced apart between the substrates. Both the substrates and the films are perpendicular to the glass plates. Electrodes are formed on the films and combine to form a semi-cylindrical stack of film. Liquid crystal fills the spaces between adjacent pairs of the films. The films are coated and/or treated by an alignment process to predispose the liquid crystals to a specific rotational direction. When a selected voltage is applied between adjacent ones of the electrodes, the liquid crystals are synchronously rotated to alter their refractive index to a desired value. Thus, when the layers of each lens are manipulated in unison, the bar code reader is able to quickly adjust its focal length to read bar codes at various distances.

45 Claims, 6 Drawing Sheets

AUTOMATED MEDIA STORAGE LIBRARY WITH VARIABLE FOCAL LENGTH LENS

BACKGROUND OF THE INVENTION

1. Technical Field

This invention relates in general to automated media storage libraries and in particular to an automated media storage library with a variable focal length lens for scanning bar coded labels associated with data storage media in the library.

2. Background Art

Automated media storage libraries which utilize storage devices such as data cartridges are well known in the art. A large number of the cartridges are typically mounted in a rotatable housing or magazine and individually indexed with bar coded labels. The labels may be positioned in a variety of locations, including on the cartridges themselves, adjacent to a mail slot on the housing, or on a door around each mail slot. A bar code reader system is located adjacent to the housing for reading the labels so that the desired cartridge may be selected and accessed. In order to scan a label associated with a moving cartridge and/or reader system, the focal length of the reader must be adjustable to accommodate for cartridges and labels which differ in size and, thus, distance from the reader. This problem has become even more acute with libraries which contain multimedia storage devices.

Therefore, it is a feature of the present invention to provide an assembly with a high speed, variable focal length lens for reading bar code labels on media devices located in an automated media storage library.

SUMMARY OF THE INVENTION

A bar code reader for an automated storage library has a lens assembly with a pair of polarized liquid crystal lenses. Each lens has pair of parallel glass plates that are separated by upper and lower glass substrates. A series of rectangular polymer films are symmetrically spaced apart between the two glass substrates. Both the substrates and the films are perpendicular to the glass plates. A semi-circular electrode is formed on each side of each piece of film to form a semi-cylindrical "stack" of film. The electrodes do not completely cover the film. Liquid crystal fills the space between each adjacent pair of the films. The films are coated and/or treated by an alignment process to predispose the liquid crystals to an alignment and rotation direction.

When a selected voltage is applied between adjacent ones of the electrodes, the liquid crystals are synchronously rotated to alter their refractive index to a desired value. Thus, when the layers of each lens are manipulated in unison, the bar code reader is able to quickly adjust its focal length to read bar codes labels on media devices at various distances. For example, when the applied voltage is zero, there is no refractive index difference between the electrode portion and the non-electrode portion of the liquid crystal. Therefore, the focal length is infinite. Applying a voltage to the electrodes alters the refractive index of the liquid crystal and, thus, shortens the focal length of the lens assembly to the proper distance for reading the labels.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

BEST MODE FOR CARRYING OUT THE INVENTION

Figure 1:
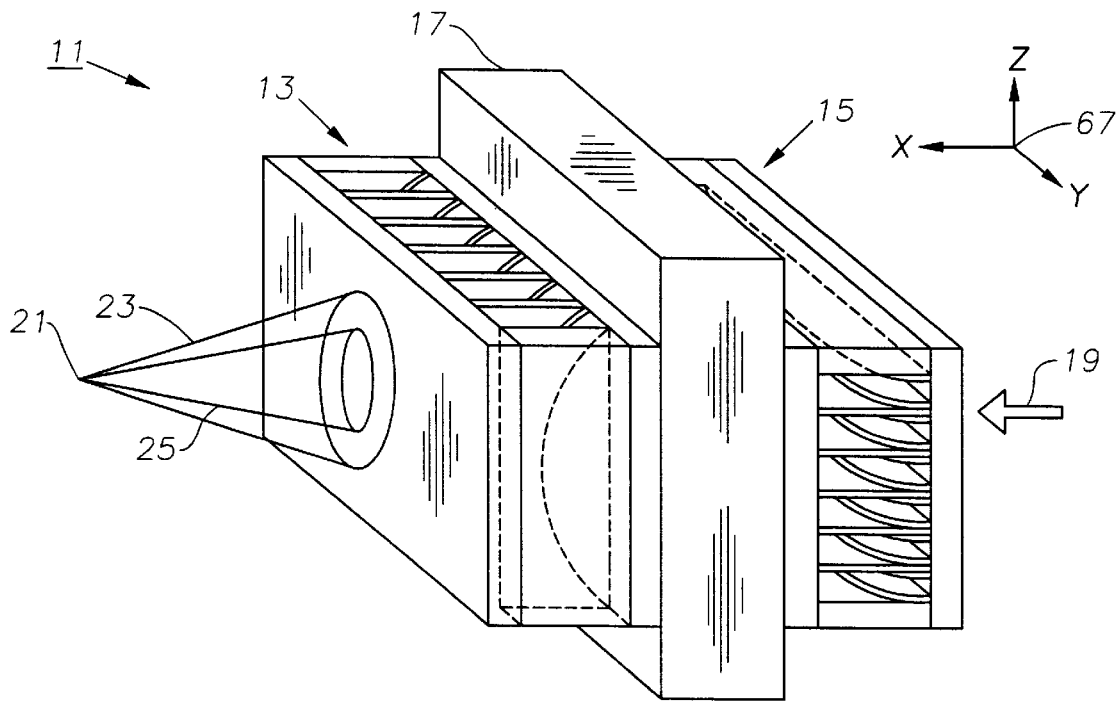
FIG. 1 is an isometric view of a lens assembly constructed in accordance with the invention.
Figure 9:
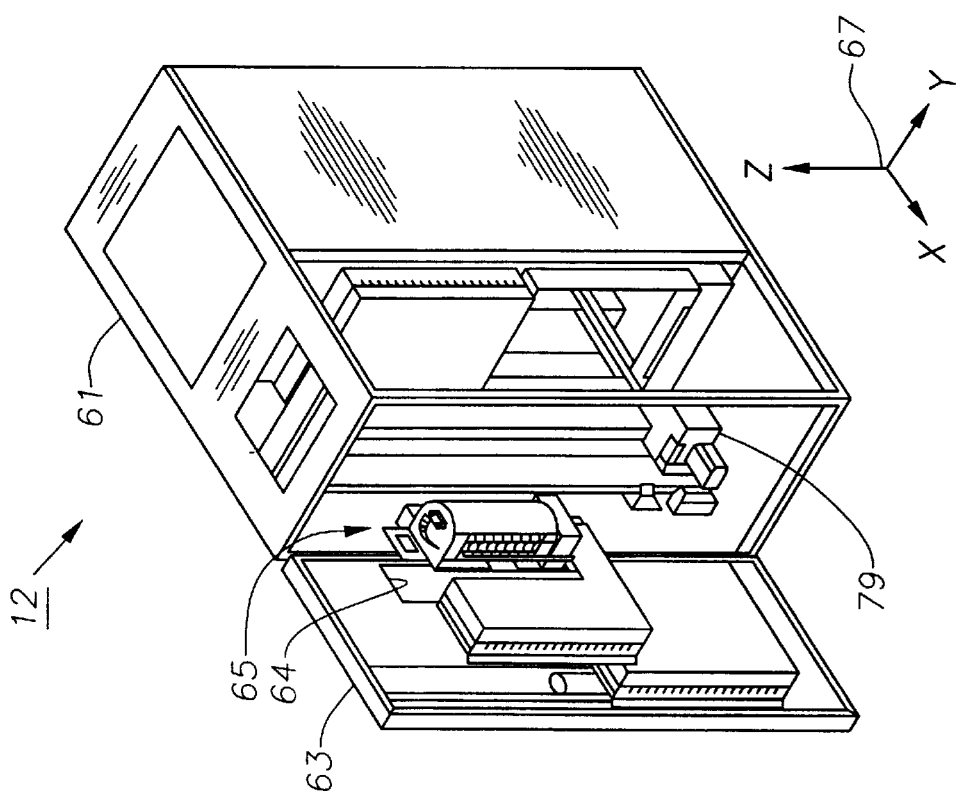
FIG. 9 is an isometric view of an automated media storage library that incorporates the lens assembly of FIG. 1 and is constructed in accordance with the invention.

Referring to FIG. 1, a sensor or lens assembly 11 for use with a bar code reader in an automated media storage library 12 (FIG. 9) is shown. Lens assembly 11 comprises a front liquid crystal (LC) lens 13, a rear LC lens 15, and a transparent spacer plate 17 therebetween. A laser light source 19 (indicated schematically by the arrow) is projected into rear lens 15 from right to left. Light source 19 is independently focused by each lens 13, 15 into a conical beam 23, 25, respectively, and focused to a common point 21 to the left of front lens 13. The thickness of spacer plate 17 is selected to be one half of one wavelength of the light emitted by light source 19.

Figure 2:
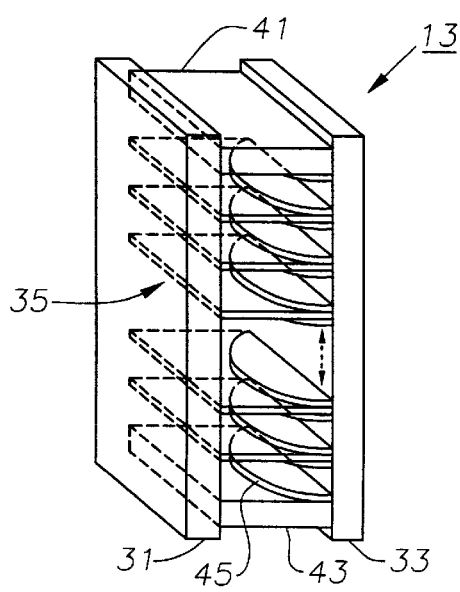
FIG. 2 is an isometric view of a single liquid crystal (LC) lens of the lens assembly of FIG. 1.
Figure 3:
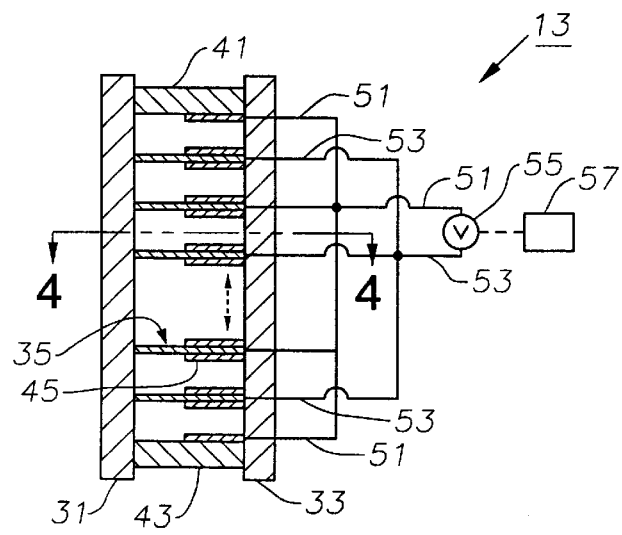
FIG. 3 is a schematic, sectional side view of the LC lens of FIG. 2.
Figure 4:
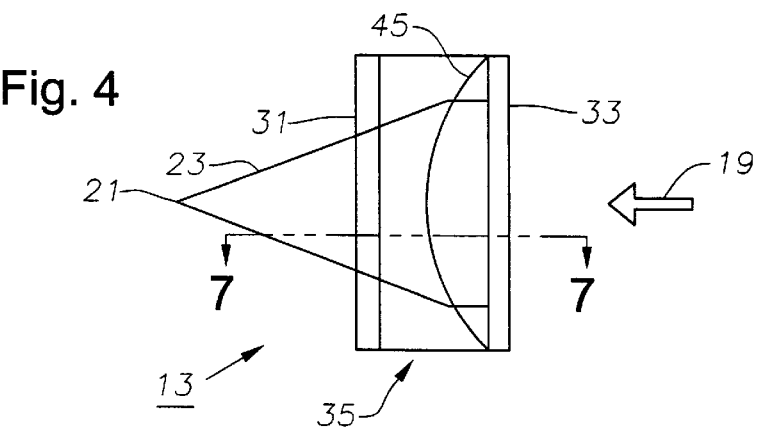
FIG. 4 is a schematic top view of the LC lens of FIG. 2 taken along the line 4—4 of FIG. 3.

Lenses 13, 15 are identical in construction and are illustrated in detail in FIGS. 2–4. For simplicity, only lens 13 will be discussed even though the following description applies equally to lens 15. Lens 13 consists of a pair of parallel, glass plates, 31, 33, and a plurality of thin, rectangular, insulative, polymer films 35 therebetween. In the embodiment shown, plates 31, 33 are 1 mm squares. The inner surfaces of plates 31, 33 are spaced apart by 70 microns which is also the width of films 35. Each film 35 has a length of 1 mm and a thickness of 2 microns. A pair of glass substrates 41, 43 are located at the upper and lower ends, respectively, of lens 13 with films 35 therebetween. Films 35 and substrates 41, 43 are parallel to one another, and perpendicular to plates 31, 33. Films 35 and substrates 41, 43 are evenly spaced apart from one another by 50 microns. Thus, in the embodiment shown, there are 19 films 35 which define 20 layers between substrates 41, 43.

The upper and lower surfaces of each film 35 and the inner surfaces of substrates 41, 43 have an electrode 45 formed on them. In the embodiment shown, electrodes 45 are semi-circular in shape with a radius of 2 mm, but they may be formed in any other shape that also would produce a positive focal length. As will be discussed below, the radius of electrodes 45 is determined by the range of focal lengths required by the application. Although electrodes 45 have a thickness that is less than 10 nm, they are shown much thicker for illustration purposes. Electrodes 45 may be sputtered to the desired shape with a patterned mask, or sputtered over the entire rectangular surface of films 35 and substrates 41, 43, and then chemically etched with a patterned photo-resist to obtain the desired shape. Other processes, such as photolithography, may also be used to obtain the desired pattern for electrodes 45.

After electrodes 45 are formed, an alignment material (not shown) is spin-coated or printed on top of the electrodes and the remaining surface area of the underlying substrate. The most popular alignment material for liquid crystal is polyimide. However, any material for homogenous parallel alignment, such as polyvinyl alcohol, may be used. The alignment material has a thickness of 30 nm or less. After the alignment material has coated the electrodes and their substrates, an alignment process, such as rubbing, is performed on the alignment material to set the desired alignment direction for the liquid crystals. Other alignment processes, such as photoalignment, which establish parallel homogenous alignment may also be used.

The alignment effect from the surface of the substrate is limited to several dozen microns (approximately 30 to 70 microns). Therefore, films 35 are mounted in spacers (not shown) to maintain their 50 micron spacing. The spacing between films 35 could be larger or smaller, as long as the alignment effect is maintained. The films 35, substrates 41, 43, and plates 31, 33 are then assembled together to form lens 13 before the liquid crystals 47 are injected into the spaces or cells.

Note that the total thickness of each film 35, including an electrode 45 and outer layer of alignment material on each surface (which are substantially negligible at 20 nm and 60 nm total) is approximately 2 microns. Since there is only one film 35 for every 50 microns of transmission width, the amount of light transmitted by lens assembly 11 is diminished by only 4% per lens 13, 15, or 8% total.

Figure 14:
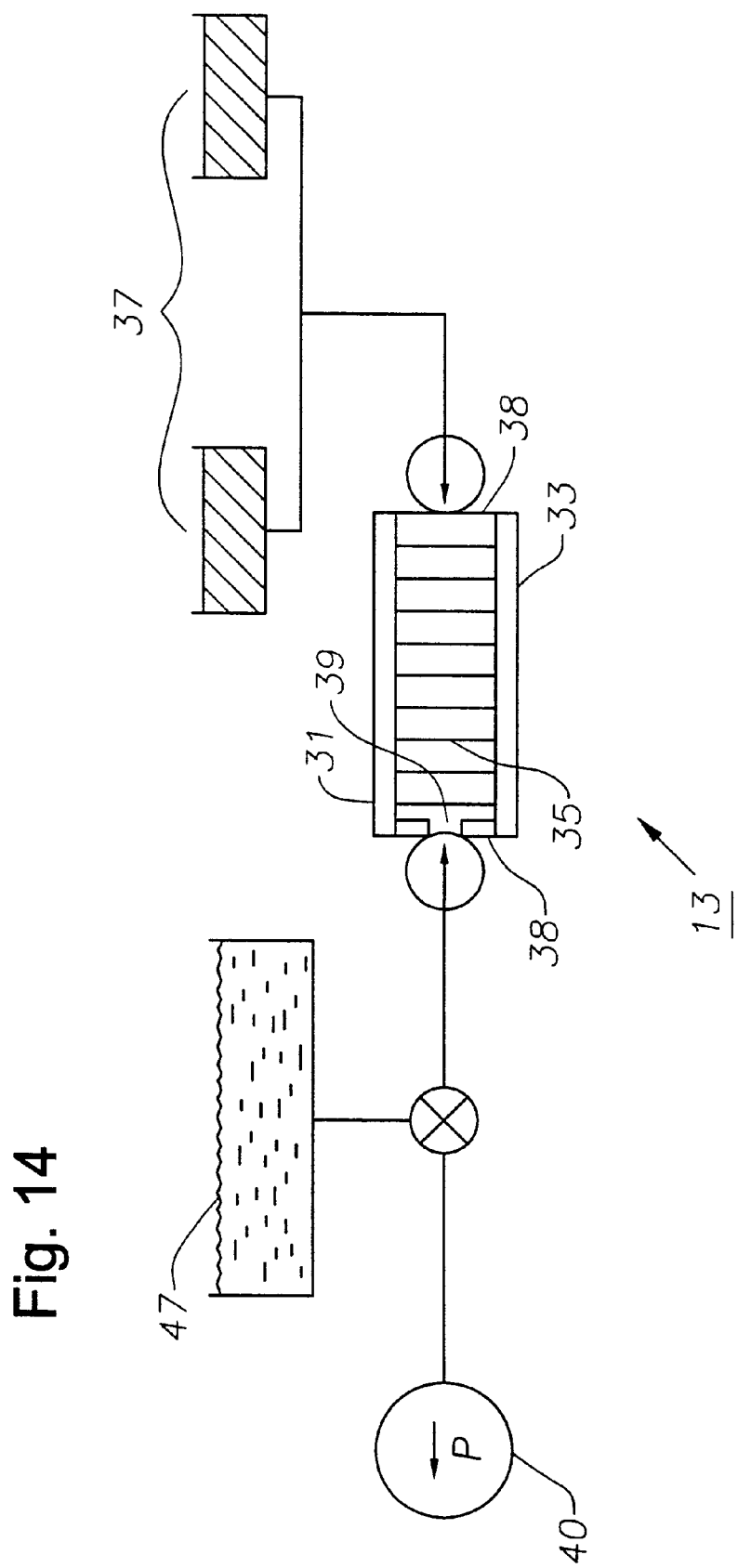
FIG. 14 is a schematic drawing of a method for making the LC lens of FIG. 2.

Referring to FIG. 14, lens 13 is assembled by dispensing heat curable epoxy resin 37 around the perpendicular glass plates 31, 33, films 35, substrates 41, 43 and spacers to form a seal 38 therebetween. An opening 39 in the lens body assembly 13 is reserved for injecting the liquid crystals 47. After curing the epoxy, the liquid crystals 47 are injected through opening 39 into the cells between films 35 with a vacuum injection technique. The air in the cells is removed with a pump 40 to create a vacuum and opening 39 in seal 38 is immersed into the liquid crystals 47 to fill the cells by capillary action. Opening 39 is sealed after the lens 13 is filled.

Figure 5:
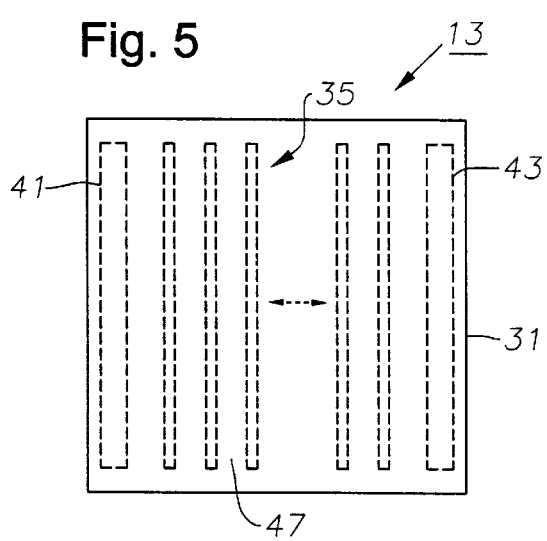
FIG. 5 is a front view of the LC lens of FIG. 2 showing a first configuration.
Figure 6:
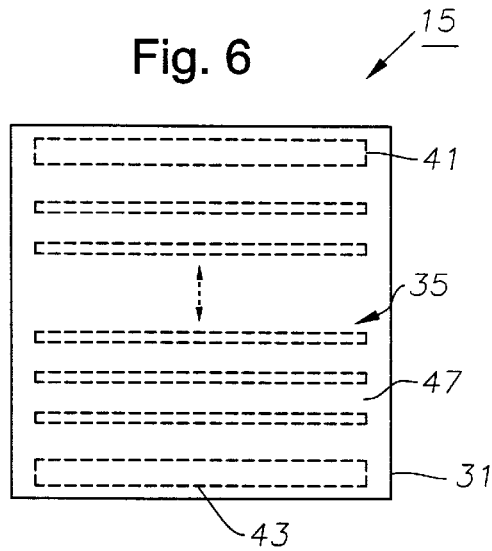
FIG. 6 is a front view of the LC lens of FIG. 2 showing a second configuration.

As shown in FIGS. 5 and 6, liquid crystal 47 fills the spaces between films 35 and substrates 41, 43. FIGS. 1, 5 and 6 also show the perpendicular orientation of lenses 13, 15 relative to one another and the lens assembly 11 overall. In the embodiment shown, the layers of front lens 13 are vertically oriented, and the layers of rear lens 15 are horizontally oriented to form a polarized lens assembly 11.

Each lens 13, 15 can only focus in one direction, hence, lenses 13, 15 are rotated and fixed at 90 degrees relative to each other. Spacer plate 17 is required for two-dimensional focusing. For example, referring to the Cartesian coordinate system 67 in FIG. 1, lens 13 could control focusing in an Y-plane angle of light beam 19, while lens 15 controls the Z-plane angle. Thus, the coaxial direction is the X-direction.

Figure 7:
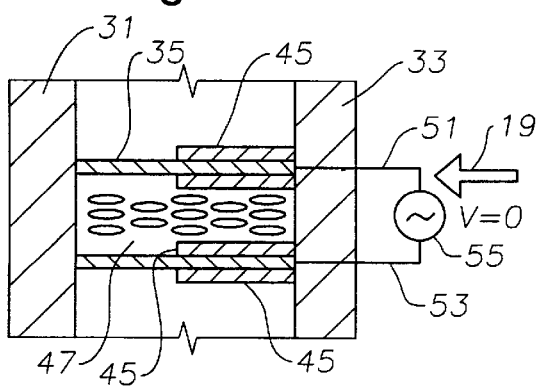
FIG. 7 is a schematic, enlarged, sectional side view of a portion of the LC lens of FIG. 2 shown without an applied voltage and taken along the line 7—7 of FIG. 4.
Figure 8:
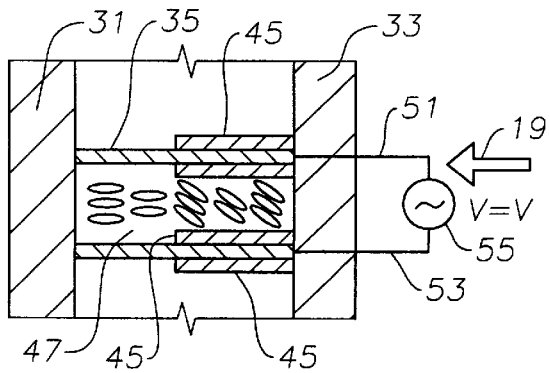
FIG. 8 is a sectional side view of the portion of the LC lens of FIG. 7 shown with an applied voltage.

Referring now to FIGS. 3, 7, and 8, the leads 51, 53 of a voltage source 55 are connected to electrodes 45 in an alternating pattern. A focal length controller 57 is provided for controlling the voltage of voltage source 55. Although both electrodes 45 on each film 35 have the same the same orientation, the adjacent films 35 (both above and below) have the opposite orientation so that the liquid crystal 47 lying therebetween is exposed to the voltage potential. Thus, the liquid crystal 47 in each cell or space between the films 35 may be manipulated simultaneously and in unison. The amount of voltage required to manipulate liquid crystals 47 is minimized as the spacing between films 35 is only 50 microns.

Note that electrodes 45 do not extend across the entire width of films 35 and substrates 41, 43. In the embodiment shown, electrodes 45 only cover about two-thirds of the surface area of their respective substrates. Thus, a portion of the birefringent liquid crystal 47 lying between adjacent films 35 (above and below the left sides of films 35) is not subjected to the voltage potential in order to vary the focal length of lens assembly 11. Since, the minimum focal length is 10 mm and the difference between the ordinary (left side) and extraordinary (right side) refractive indexes of liquid crystal 47 is about 0.2, the radius of electrodes 45 must be no larger than the product of the focal length and the index difference (hence, 10 mm×0.2=2 mm radius).

In FIG. 7, the applied voltage is zero, so liquid crystals 47 are identically aligned and oriented on both sides of films 35 (only two films shown). In FIG. 8, the applied voltage does not equal zero, so the alignment direction of the liquid crystals 47 on the right side of films 35 are proportionately reoriented, and the liquid crystals 47 on the left side of films 35 remain unaffected. This changes the refractive index of the liquid crystals 47 and, thus, the focal length of lens assembly 11.

Note that since lenses 13, 15 are spaced apart from each other along the X-axis, the voltages applied to them must be different in order to focus at the same X-axial point 21. The focal length of lens 15 should be longer than that of lens 13. Since the difference in the focal lengths is fixed by the configuration, the relation of the applied voltage to lenses 13, 15 can be calculated. Controller 57 calculates the applied voltages to lenses 13, 15 according to the information from the bar code reader. For example, if the focal length of lens 15 is 15.0 mm, and the total thickness of spacer plate 17 and lens 13 is 5.0 mm, the focal length of lens 13 would be 10 mm. Lenses 13, 15 focus light 19 simultaneously to a single point 21.

Figure 10:
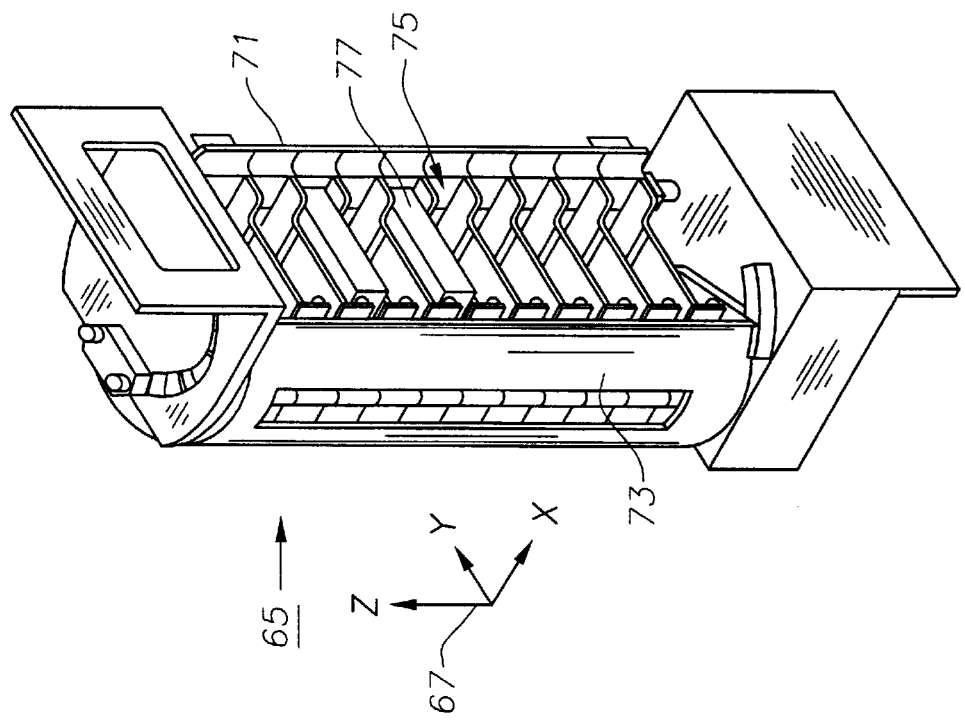
FIG. 10 is an enlarged front isometric view of a cartridge station of the library of FIG. 9 wherein the door of the station is open.

In operation (FIGS. 9–13), library 12 has a base 61 containing a plurality of drives (not shown) and a door 63 with an opening 64. Door 63 is pivotally mounted to base 61 and is normally closed, but shown open in FIG. 9. A mail slot or cartridge input/output (I/O) station 65 is mounted to door 63 (shown exploded from door 63 in FIG. 9). Station 65 has a generally cylindrical, stationary body or magazine 71 with a coaxial door 73 that is pivotable or rotatable about the Z-axis relative to body 71. Door 73 has a generally cylindrical shape and is shown open in FIG. 10 and closed in FIG. 11. Magazine 71 has a plurality of parallel, cartridge storage slots 75, each of which may contain one or more data cartridges 77 (two shown). Cartridges 77 may comprise tape, magneto-optical disk, digital versatile disk (DVD), high density floppy disks, or high density removable hard disk cartridges. Typically, library 12 does not have mixed media in it, but it is capable of handling such. Cartridges 77 are exported from library 12 in the +X direction, and imported in the −X direction. A robotic picker 79 (FIG. 9) moves cartridges 77 to and from magazine 71 in the Y-Z plane.

When door 73 is open (FIG. 10), a user can manually insert cartridges 77 into or remove them from slots 75 in magazine 71 through opening 64 in door 63. When door 73 is closed by the user, robotic picker 79 can access the cartridges 77 placed into slots 75 (cartridge import). Alternately, when door 73 is closed, picker 79 can place more cartridges 77 into magazine 71 for removal from library 12 (cartridge export). Both of these operations are necessary since library 12 has a finite amount of cartridge storage space. Inactive cartridges which still contain valuable data are exported and shipped to a warehouse, the lowest tier in the data storage hierarchy. Each inactive cartridge is replaced by a newly imported cartridge.

Figure 12:
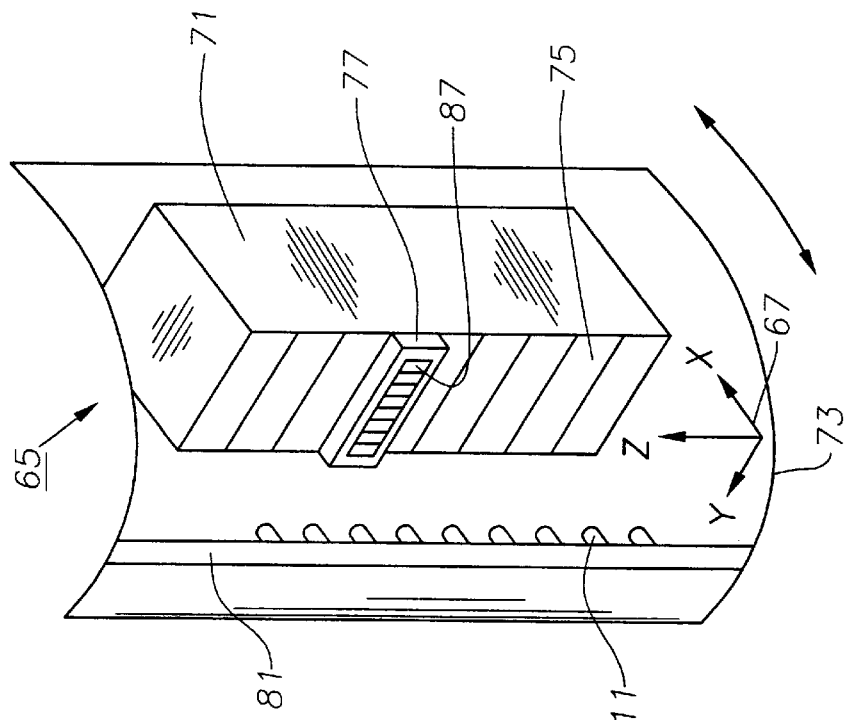
FIG. 12 is a schematic, rear isometric view of the cartridge station of FIG. 11.
Figure 11:
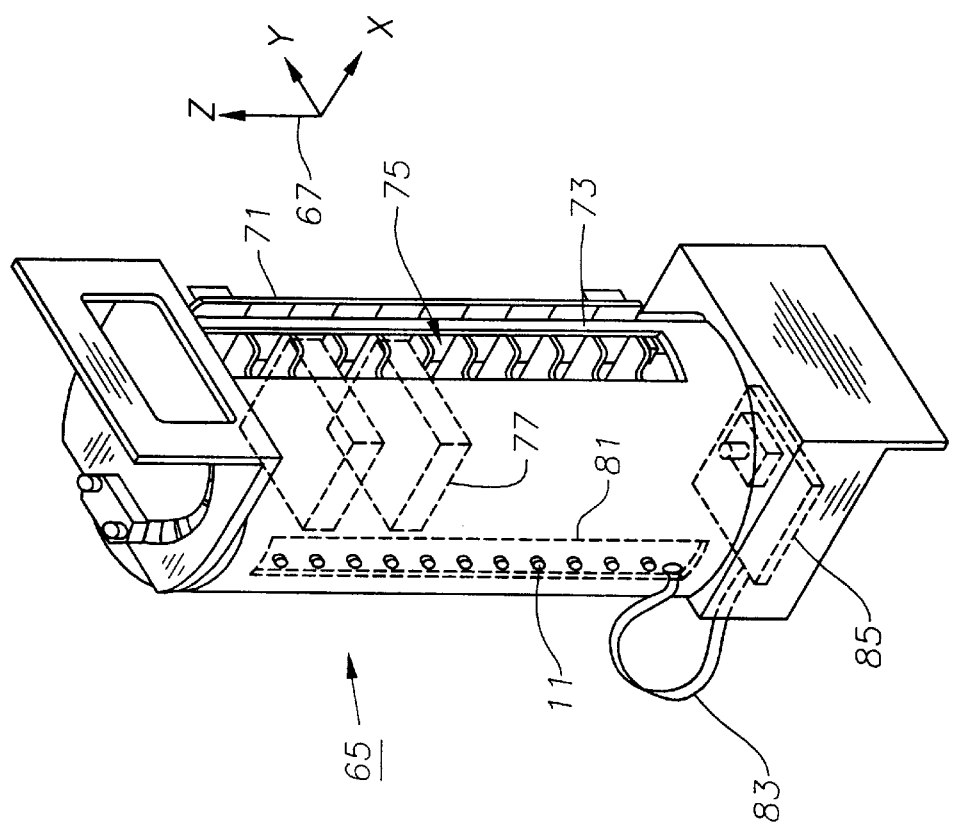
FIG. 11 is a schematic front isometric view of the cartridge station of FIG. 10 with the door closed.
Figure 13:
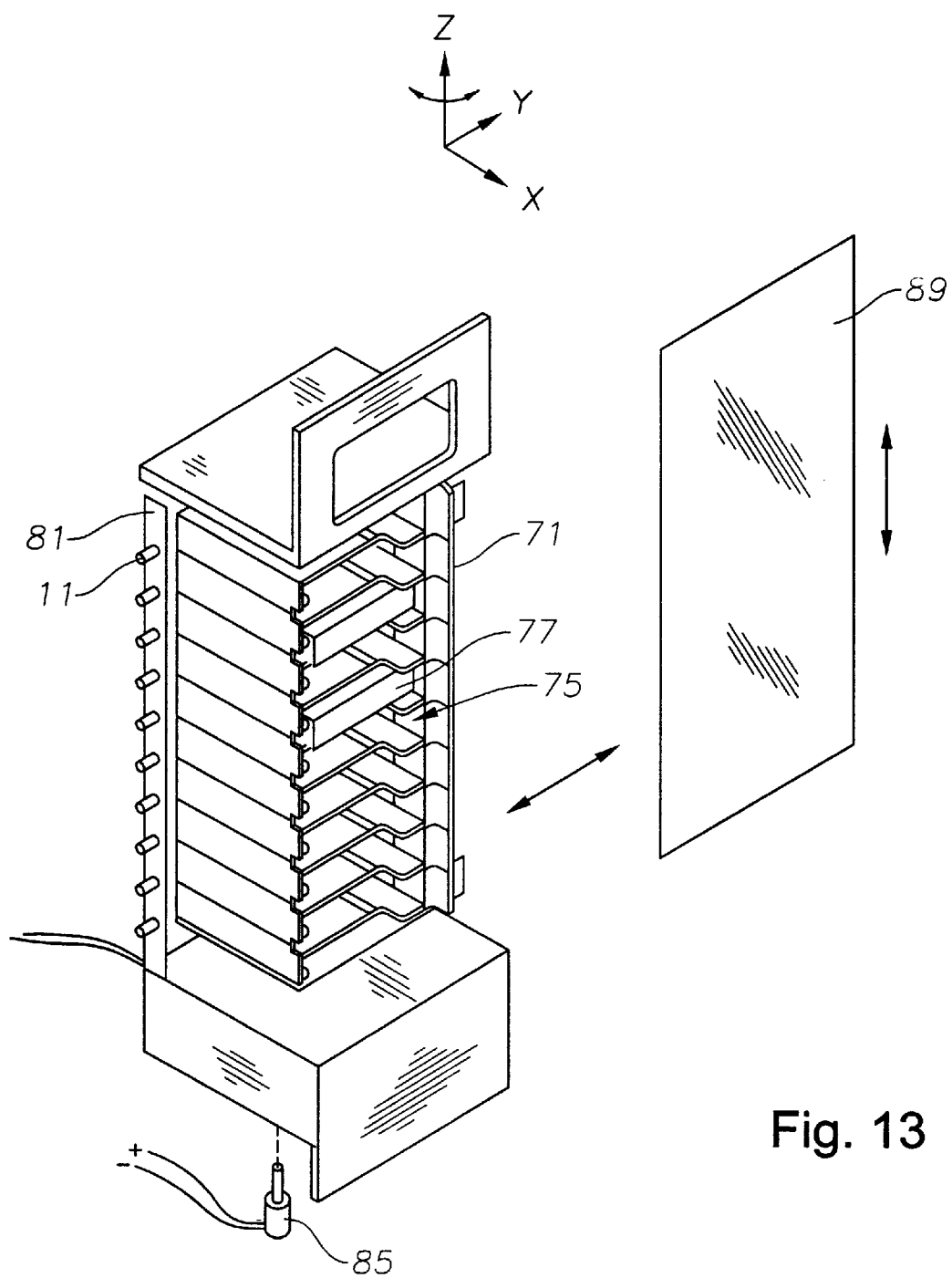
FIG. 13 is a schematic, rear isometric view of an alternate embodiment of the cartridge station of FIG. 11.

Referring now to FIGS. 11 and 12, a plurality of sensors 11 are mounted to an inner portion 81 of door 73 and, thus, rotatable therewith. Sensors 11 are vertically arrayed to align with the slots 75 of magazine 71 in a one-to-one ratio. Door 73 and sensors 11 pivot relative to stationary magazine 71. Power to and electrical signals from sensors 11 are transmitted on cable 83. Cable 83 also carries power to a motor 85 that opens and closes door 73. A master cable (not shown) extends from motor 85 and sensors 11 to controller 57. Door 73 allows a user to manually access cartridges 77 in library 12 through opening 64.

A bar coded label 87 is affixed to a rear side edge of each cartridge 77. Labels 87 may also be located adjacent to cartridges 77 near slots 75 (not shown). The lines of the bar code are parallel to the axis of rotation of sensors 11. The orientation of the bar code lines causes the sensors 11 to sweep along a line perpendicular thereto. In the preferred embodiment, door 73 is pivoted and sensors 11 pivot past the rear side edges of stationary cartridges 77 to scan labels 87. It is the swinging of door 73 which moves sensors 11, with their liquid crystal lenses 13, 15, across the labels 87 which identifies cartridges 77 in station 65 to controller 57. If the bar code reader cannot read the code on a label 87, controller 57 changes the focal length of lenses 13, 15 in the respective sensor 11 to focus the code image on the reader.

Alternatively, sensors 11 remain stationary and magazine 71 is pivoted about the Z-axis (FIG. 13) by motor 85. Sensors 11 read the barcodes 87 (not shown) on the backs of cartridges 77 as magazine 71 sweeps around. This alternate embodiment also utilizes a siding planar door 89 rather than the cylindrical door 73 of the preferred embodiment. Door 89 may be configured to move or slide in either the Y-direction or in the Z-direction to allow a user to manually access cartridges 77 through opening 64 in library 12. With both of these embodiments, there is no mechanical motion of the components of sensor 11. Thus, the focus action is always fast and responsive.

The information scanned from the cartridges 77 in magazine 71 is relayed to controller 57 or a central data base for processing. The robotic picker 79 would then move or handle individual cartridges 77 based on instructions from controller 57. However, controller 57 must identify each cartridge 77 before giving commands to picker 79. Thus, controller 57 can give instructions to picker 79 as to which cartridges 77 are to be stored in which slots 75 and which cartridges (if any) are to be directed into drives for immediate data I/O operations.

The invention has several advantages. The lens assembly uses liquid crystal lenses that can change their focal lengths at high speeds by merely varying an applied voltage in response to the focal length controller. The lens assembly is completely stationary and utilizes no moving parts. This design is readily incorporated into automated storage libraries having various configurations. The invention is well suited for libraries which contain various types of storage media or bar code labels or differing sizes.

While the invention has been shown or described in only some of its forms, it should be apparent to those skilled in the art that it is not so limited, but is susceptible to various changes without departing from the scope of the invention.

We claim:

1. An apparatus for identifying components, each having a label fixedly mounted in relation to the component and having information associated with the component, comprising:

a first element having a plurality of storage positions that are adapted to support the components;

a second element located adjacent to the first element, such that the first and second elements are movable relative to one another;

a sensor mounted to the second element and having a light source and a variable focal length lens assembly that is adapted to read the labels associated with the components, wherein the lens assembly comprises polarized liquid crystal lenses, each having a plurality of parallel substrates containing liquid crystal therebetween, each of the substrates having an electrode for applying a variable voltage to the liquid crystal located between said electrode and an adjacent electrode for altering the refractive index of the liquid crystal and, thus, the focal length of the lens assembly; and controller connected to the sensor and at least one of the first and second elements for moving said one of the first and second elements relative to the other and adjusting the focal length of said lens assembly of the sensor to focus on and read the labels so that the information associated with their respective components may be processed by the controller.

2. The apparatus of claim 1, further comprising a picking device fixed mounted adjacent to the first element for moving the components in response to the controller processing the information.

3. The apparatus of claim 1 wherein the sensor comprises a plurality of sensors that are equal in number to the number of storage positions of the first element, and wherein each of the sensors is aligned and associated with one of the storage positions.

4. The apparatus of claim 1 wherein the second element is pivoted relative to the first element.

5. The apparatus of claim 1 wherein the first element is pivoted relative to the second element.

6. The apparatus of claim 1 wherein the storage positions of the first element are an array of parallel slots for supporting a plurality of the components in a one-to-one ratio.

7. The apparatus of claim 1 wherein the lens assembly of the sensor has a focal length range of approximately 10 mm to infinity.

8. The apparatus of claim 1 wherein the sensor is devoid of moving parts.

9. The apparatus of claim 1 wherein the sensor is a bar code reader.

10. The apparatus of claim 1 wherein the lenses are separated by a transparent spacer having a width equal to one-half wavelength of the light source of the sensor.

11. The apparatus of claim 1 wherein each of the substrates is coated with an alignment material.

12. The apparatus of claim 11 wherein the alignment material has been processed to set a desired alignment direction for the liquid crystal.

13. The apparatus of claim 1 wherein adjacent ones of the substrates are equally spaced apart by a distance in the range of 30 to 70 microns.

14. The apparatus of claim 1 wherein each of the substrates has a thickness of approximately 2 microns and a width of approximately 70 microns.

15. The apparatus of claim 1 wherein the electrodes on the substrates are generally arcuate in shape.

16. An apparatus for identifying components, each having a label fixedly mounted in relation to the component and having information associated with the component, comprising:

a first element having a plurality of storage positions that are adapted to support the components;

second element located adjacent to the first element, such that the first and second elements are movable relative to one another;

a sensor mounted to the second element and having a light source and a variable focal length lens assembly that is adapted to read the labels associated with the components; and a controller connected to the sensor and at least one of the first and second elements for moving said one of the first and second elements relative to the other and adjusting the focal length of said lens assembly of the sensor to focus on and read the labels so that the information associated with their respective components may be processed by the controller; and wherein the first element is a stationary support structure and the second element is an arcuate door which is both manually and automatically operable relative to the stationary support structure.

17. An automated media storage library having a base with a media drive unit and a picking device for interacting with data storage devices located therein, each of the data storage devices having a label fixedly mounted in relation thereto and having information associated with its respective data storage device, the library comprising:

an input/output station mounted to the base and having a scanner and a magazine with a plurality of storage positions that are adapted to contain the data storage devices, the scanner and the magazine being movable relative to one another;

the scanner having a sensor mounted thereto with a light source and a variable focal length lens assembly that is adapted to read the labels associated with the data storage devices, wherein the lens assembly of the sensor comprises polarized liquid crystal lenses, each lens having a plurality of parallel substrates containing liquid crystal therebetween, and each of the substrates having an electrode for applying a variable voltage to the liquid crystal located between said electrode and an adjacent electrode for altering the refractive index of the liquid crystal and, thus, the focal length of the lens assembly;

a controller adapted to be connected to the media drive unit, the picking device, and the input/output station for moving one of the scanner and the magazine relative to the other and adjusting the focal length of said lens assembly to focus on and read the labels so that the information associated with their respective data storage devices may be processed by the controller; and wherein the picking device moves selected ones of the data storage devices from said positions of the magazine to the media drive unit in response thereto.

18. The library of claim 17 wherein the scanner comprises a plurality of sensors which are equal in number to the number of positions in the magazine, and wherein each of the sensors is aligned and associated with one of the positions.

19. The library of claim 17 wherein the scanner is pivoted relative to the magazine.

20. The library of claim 17 wherein the magazine is pivoted relative to the scanner.

21. The library of claim 17 wherein the scanner is an arcuate door which is both manually and automatically operable relative to the magazine.

22. The library of claim 17 wherein the input/output station is mounted inside the base and is manually accessible from an exterior of the base.

23. The library of claim 17 wherein the lens assembly of the sensor has a focal length range of approximately 10 mm to infinity.

24. The library of claim 17 wherein the scanner is a bar code reader.

25. The library of claim 17 wherein the lenses are separated by a transparent spacer having a width equal to one-half wavelength of the light source of the sensor.

26. The library of claim 17 wherein each of the substrates is coated with an alignment material.

27. The library of claim 26 wherein the alignment material has been processed to set a desired alignment direction for the liquid crystal.

28. The library of claim 17 wherein adjacent ones of the substrates are equally spaced apart by a distance in the range of 30 to 70 microns.

29. The library of claim 17 wherein each of the substrates has a thickness of approximately 2 microns and a width of approximately 70 microns.

30. The library of claim 17 wherein the electrodes on the substrates are generally arcuate in shape.

31. An automated media storage library having a base with a media drive unit and a picking device for interacting with data storage devices located therein, each of the data storage devices having a label fixedly mounted in relation thereto and having information associated with its respective data storage device, the library comprising:

an input/output station mounted to the base and having a scanner and a magazine with a plurality of storage positions that are adapted to contain the data storage devices, the scanner being pivotable relative to the magazine;

the scanner having a plurality of sensors mounted thereto, each having a light source and a variable focal length lens assembly that is adapted to read the labels associated with the data storage devices, the sensors being equal in number to the number of positions in the magazine, and wherein each of the sensors is aligned and associated with one of the positions;

a controller adapted to be connected to the media drive unit, the picking device, and the input/output station for moving the scanner relative to the magazine and adjusting the focal lengths of said lens assemblies to focus on and read the labels so that the information associated with their respective data storage devices may be processed by the controller; wherein the picking device moves selected ones of the data storage devices from said positions of the magazine to the media drive unit in response thereto; and wherein each of the lens assemblies comprises a pair of polarized liquid crystal lenses, and each pair of lenses is separated by a transparent spacer having a width equal to one-half wavelength of the light sources.

32. The library of claim 31 wherein the scanner is an arcuate door which is both manually and automatically operable relative to the magazine.

33. The library of claim 31 wherein each of the lens assemblies has a focal length range of approximately 10 mm to infinity.

34. The library of claim 31 wherein the scanner is a bar code reader.

35. The library of claim 31 wherein each lens comprises a plurality of parallel substrates containing liquid cystal therebetween, each of the substrates having an electrode for applying a variable voltage to the liquid crystal located between said electrode and an adjacent electrode for altering the refractive index of the liquid crystal and, thus, the focal lengths of the lens assemblies.

36. The library of claim 35 wherein each of the substrates is coated with an alignment material.

37. The library of claim 36 wherein the alignment material has been processed to set a desired alignment direction for the liquid crystal.

38. The library of claim 35 wherein adjacent ones of the substrates are equally spaced apart by a distance in the range of 30 to 70 microns.

39. The library of claim 35 wherein the electrodes on the substrates are generally arcuate in shape.

40. An automated media storage library having a base with a media drive unit and a picking device for interacting with data storage devices located therein, each of the data storage devices having a label fixedly mounted in relation thereto and having information associated with its respective data storage device, the library comprising:

an input/output station mounted to the base and having a door and a magazine with a plurality of storage slots that are adapted to contain the data storage devices, the door being pivotable relative to the magazine;

the door having a plurality of sensors mounted thereto, each having a light source and a variable focal length lens assembly with a pair of liquid crystal lenses that are adapted to read the labels associated with the data storage devices, the sensors being equal in number to the number of slots in the magazine, and wherein each of the sensors is aligned and associated with one of the slots;

each lens comprising a plurality of parallel substrates containing liquid crystal therebetween, each of the substrates having an electrode for applying a variable voltage to the liquid crystal located between said electrode and an adjacent electrode for altering the refractive index of the liquid crystal and, thus, the focal lengths of the lens assemblies;

a controller adapted to be connected to the media drive unit, the picking device, and the input/output station for moving the door relative to the magazine and adjusting the focal lengths of the lens assemblies to focus on and read the labels so that the information associated with their respective data storage devices may be processed by the controller; wherein the picking device moves selected ones of the data storage devices from said slots of the magazine to the media drive unit in response thereto; and wherein each of the substrates is coated with an alignment material that has been processed to set a desired alignment direction for the liquid crystal.

41. The library of claim 40 wherein the door is both manually and automatically pivotable relative to the magazine.

42. The library of claim 40 wherein each of the lens assemblies has a focal length range of approximately 10 mm to infinity.

43. The library of claim 40 wherein each pair of lenses is separated by a transparent spacer having a width equal to one-half wavelength of the light sources.

44. The library of claim 40 wherein adjacent ones of the substrates are equally spaced apart by a distance in the range of 30 to 70 microns.

45. The library of claim 40 wherein the electrodes on the substrates are generally arcuate in shape.

* * * * *